US012662946B2

(12) United States Patent

Philbrick et al.

(10) Patent No.: US 12,662,946 B2

(45) Date of Patent: Jun. 23, 2026

(54) TURBINE ENGINE TIP CLEARANCE CONTROL UTILIZING ELECTRIC MACHINE

(71) Applicant: RTX Corporation, Farmington, CT (US)

(72) Inventors: Graham R. Philbrick, Durham, CT (US); Gary Collopy, Vernon, CT (US); John P. Virtue, Jr., Middletown, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/235,417

(22) Filed: Aug. 18, 2023

(65) Prior Publication Data

US 2025/0027425 A1 Jan. 23, 2025

Related U.S. Application Data

(60) Provisional application No. 63/527,554, filed on Jul. 18, 2023.

(51) Int. Cl.

*F01D 15/10* (2006.01)

*F01D 11/22* (2006.01)

(52) U.S. Cl.

CPC .............. *F01D 15/10* (2013.01); *F01D 11/22* (2013.01); *F05D 2270/053* (2013.01)

(58) Field of Classification Search

CPC .......... F01D 11/14; F01D 11/20; F01D 11/22; F01D 15/10; B64D 31/16; B64D 31/18; B64D 35/021; B64D 35/022; B64D 35/026

See application file for complete search history.

(56) References Cited

U.S. PATENT DOCUMENTS

| | | | |
|---|---|---|---|
| 7,926,287 | B2 | 4/2011 | Ullyott |
| 8,011,883 | B2 | 9/2011 | Schwarz et al. |
| 8,201,414 | B2 | 6/2012 | Haehner |
| 9,890,707 | B2 | 2/2018 | Kraft |
| 10,436,122 | B2 | 10/2019 | Cline |
| 11,125,104 | B2 | 9/2021 | Bacic |
| 11,326,526 | B2 | 5/2022 | Turner |

(Continued)

OTHER PUBLICATIONS

EP Search Report for EP Patent Application No. 24189510.1 dated May 19, 2025.

*Primary Examiner* — Thomas P Burke

(74) *Attorney, Agent, or Firm* — Getz Balich LLC

(57) ABSTRACT

An operating method is provided during which a command is received to increase thrust generated by a propulsor rotor from a first thrust level to a second thrust level. The propulsor rotor is operatively coupled to an engine core and an electric machine. The engine core includes a flowpath, a compressor section, a combustor section and a turbine section. The engine core is operated in a transient state to increase power output from the engine core to the propulsor rotor from a first power level to a second power level in response to the command. The electric machine is operated to boost the power output from the engine core to the propulsor rotor while the engine core is operating in the transient state. A clearance control system for the engine core is operated based on the operation of the electric machine.

15 Claims, 6 Drawing Sheets

(56) References Cited

U.S. PATENT DOCUMENTS

| | | | | |
|---|---|---|---|---|
| 11,428,171 | B2 * | 8/2022 | Brown | F02C 9/28 |
| 11,480,112 | B2 | 10/2022 | Whatley | |
| 11,548,651 | B2 | 1/2023 | Terwilliger | |
| 11,933,232 | B1 * | 3/2024 | Schelfaut | F02C 6/00 |
| 12,209,501 | B1 * | 1/2025 | Philbrick | F02C 6/00 |
| 2010/0126178 | A1 * | 5/2010 | Hyde | F02K 3/025 60/645 |
| 2015/0247417 | A1 * | 9/2015 | Bacic | F04D 27/001 415/30 |
| 2019/0002113 | A1 * | 1/2019 | Gansler | B64D 27/02 |
| 2019/0345837 | A1 * | 11/2019 | Bacic | F02C 9/42 |
| 2019/0360400 | A1 * | 11/2019 | Elliott | F02C 7/04 |
| 2020/0025149 | A1 * | 1/2020 | Hrach | F01D 11/14 |
| 2020/0039657 | A1 | 2/2020 | Ransom | |
| 2021/0131355 | A1 | 5/2021 | Szarvasy | |
| 2022/0397064 | A1 | 12/2022 | Muldoon | |
| 2023/0358147 | A1 * | 11/2023 | Kim | H10N 30/50 |

* cited by examiner

TURBINE ENGINE TIP CLEARANCE CONTROL UTILIZING ELECTRIC MACHINE

This application claims priority to U.S. Patent Appln. No. 63/527,554 filed Jul. 18, 2023 which is hereby incorporated herein by reference in its entirety.

BACKGROUND OF THE DISCLOSURE

1. Technical Field

This disclosure relates generally to a turbine engine and, more particularly, to tip clearance control for the turbine engine.

2. Background Information

A gas turbine engine may include a tip clearance control system to maintain a select clearance between blade tips of a rotor and an adjacent shroud. Various types and configurations of tip clearance control systems are known in the art. While these known tip clearance control systems have various benefits, there is still room in the art for improvement.

SUMMARY OF THE DISCLOSURE

According to an aspect of the present disclosure, an operating method is provided during which a command is received to increase thrust generated by a propulsor rotor from a first thrust level to a second thrust level. The propulsor rotor is operatively coupled to an engine core and an electric machine. The engine core includes a flowpath, a compressor section, a combustor section and a turbine section. The flowpath extends through the compressor section, the combustor section and the turbine section from an inlet into the flowpath to an exhaust from the flowpath. The engine core is operated in a transient state to increase power output from the engine core to the propulsor rotor from a first power level to a second power level in response to the command. The electric machine is operated to boost the power output from the engine core to the propulsor rotor while the engine core is operating in the transient state. A clearance control system for the engine core is operated based on the operation of the electric machine.

According to another aspect of the present disclosure, another operating method is provided during which an engine core is operated in a transient state to increase power output from the engine core to a driven rotor of a mechanical load from a first power level to a second power level. The driven rotor is operatively coupled to the engine core and an electric machine. The engine core includes a flowpath, a compressor section, a combustor section and a turbine section. The flowpath extends through the compressor section, the combustor section and the turbine section from an inlet into the flowpath to an exhaust from the flowpath. The electric machine boosts the power output from the engine core to the driven rotor while the engine core is operating in the transient state during a first mode. The electric machine does not boost the power output from the engine core to the driven rotor while the engine core is operating in the transient state during a second mode. A clearance control system for the engine core is operated while the engine core is operating in the transient state. A blade tip clearance target for the clearance control system is greater during the second mode than during the first mode.

According to still another aspect of the present disclosure, a propulsion system is provided for an aircraft. This propulsion system includes a propulsor rotor, an engine core, an electric machine and a clearance control system. The engine core includes a compressor section, a combustor section, a turbine section, a first rotating assembly, a second rotating assembly and a flowpath extending through the compressor section, the combustor section and the turbine section. The first rotating assembly includes a first compressor rotor in the compressor section and a first turbine rotor in the turbine section. The second rotating assembly includes a second turbine rotor in the turbine section. The second rotating assembly is operatively coupled to the propulsor rotor. The electric machine is operatively coupled to the propulsor rotor. The clearance control system is configured to control clearance between the first turbine rotor and a first shroud circumscribing the first turbine rotor based on operation of the electric machine.

The driven rotor may be configured as or otherwise include a propulsor rotor.

The method may also include receiving a command to accelerate a rotational velocity of the driven rotor. The engine core may be operated in the transient state in response to receiving the command.

A first period of time to accelerate the rotational velocity of the driven rotor may be at least three times less than a second period of time for the power output from the engine core to the driven rotor to increase from the first power level to the second power level.

Power output from the electric machine to the propulsor rotor, which boosts the power output from the engine core to the propulsor rotor while the engine core is operating in the transient state, may decrease as the power output from the engine core to the propulsor rotor increases from the first power level to the second power level.

Power output from the electric machine to the propulsor rotor when the engine core enters the transient state may be equal to the power output from the electric machine to the propulsor rotor when the engine core exits the transient state.

The power output from the electric machine to the propulsor rotor when the engine core enters the transient state may be a zero power output.

The power output from the electric machine to the propulsor rotor when the engine core enters the transient state may be a non-zero power output.

A first period of time for the thrust generated by the propulsor rotor to increase from the first thrust level to the second thrust level may be less than a second period of time for the power output from the engine core to the propulsor rotor to increase from the first power level to the second power level.

The first period of time may be at least two times greater than the second period of time.

The engine core may be operated in the transient state to maintain a rate of change in temperature of combustion products within the flowpath below a threshold level.

The engine core may also include a first rotating assembly and a second rotating assembly. The first rotating assembly may include a first compressor rotor in the compressor section and a first turbine rotor in the turbine section. The second rotating assembly may include a second turbine rotor in the turbine section. The second rotating assembly may be operatively coupled to the propulsor rotor. The clearance control system may be configured to control clearance between the first turbine rotor and a first shroud circumscribing the first turbine rotor based on the operation of the electric machine.

The clearance control system may also be configured to control clearance between the second turbine rotor and a second shroud circumscribing the second turbine rotor.

The electric machine may be operatively coupled to the propulsor rotor through the second rotating assembly.

The electric machine may be operatively coupled to the propulsor rotor independent of the second rotating assembly.

Another electric machine may be operatively coupled to the first rotating assembly and may provide a zero power output to the first rotating assembly during the operation of the engine core in the transient state.

The propulsor rotor may be configured as or otherwise include a ducted propulsor rotor.

The propulsor rotor may be configured as or otherwise include an open propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
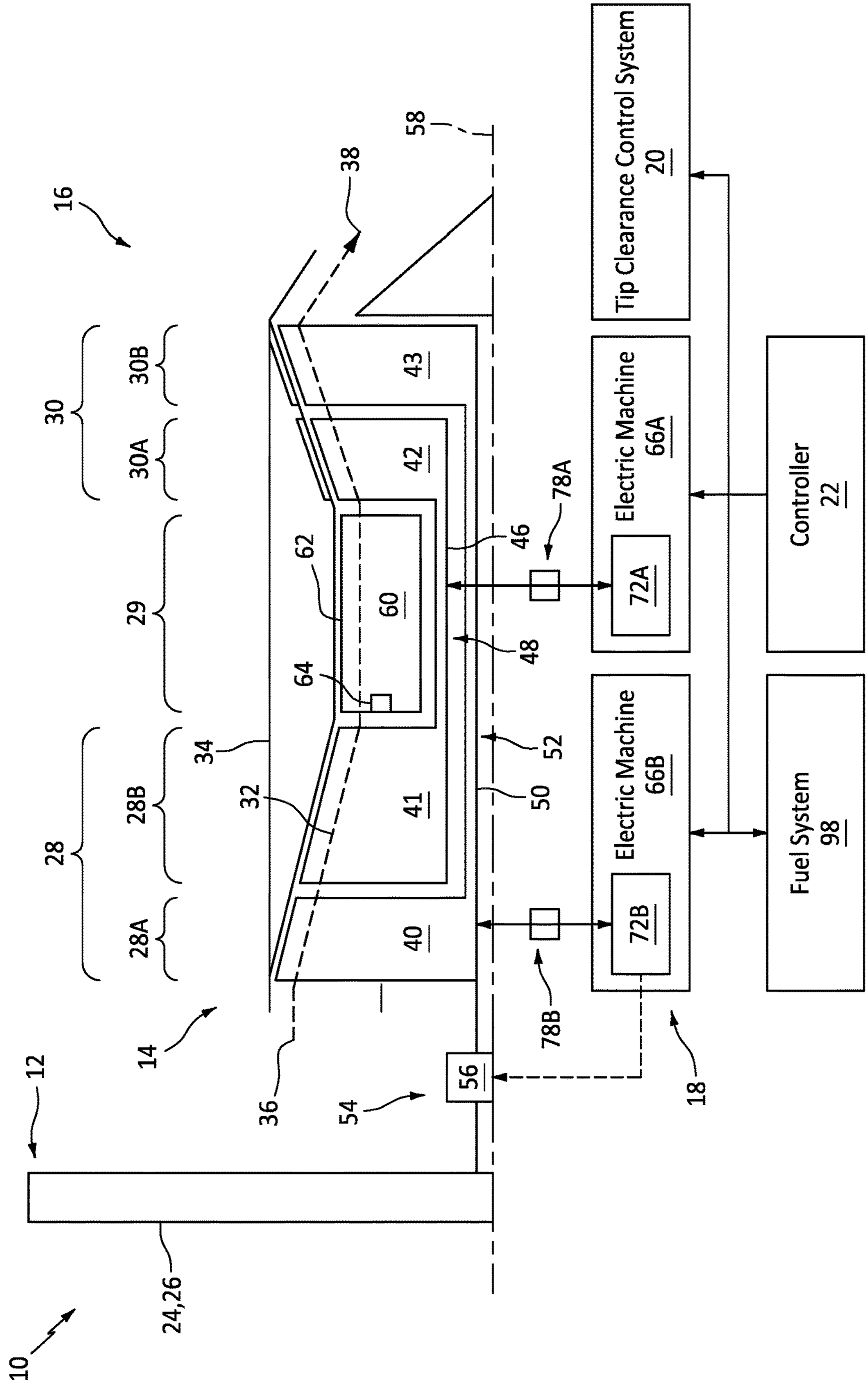
FIG. 1 is a partial schematic illustration of an aircraft propulsion system.

FIG. 1 illustrates a powerplant 10 for an aircraft. The aircraft may be an airplane, a helicopter, a drone (e.g., an unmanned aerial vehicle (UAV)) or any other manned or unmanned aerial vehicle or system. The aircraft powerplant 10 may be configured as, or otherwise included as part of, a propulsion system for the aircraft. The aircraft powerplant 10 may also or alternatively be configured as, or otherwise included as part of, an electric power system for the aircraft; e.g., an auxiliary power unit (APU) for the aircraft. The aircraft powerplant 10 of FIG. 1 includes a mechanical load 12, an engine core 14 of a gas turbine engine 16, an electric machine system 18, an active tip clearance control system 20 and a controller 22.

The mechanical load 12 may be configured as or otherwise include a rotor 24 mechanically driven and/or otherwise powered by the engine core 14 and/or the electric machine system 18. This driven rotor 24 may be a bladed propulsor rotor 26 (e.g., an air mover) where the aircraft powerplant 10 is (or is part of) the aircraft propulsion system. The propulsor rotor 26 includes a plurality of rotor blades arranged circumferentially around and connected to at least (or only) one rotor disk or hub. The propulsor rotor 26 may be an open (e.g., un-ducted) propulsor rotor or a ducted propulsor rotor. Examples of the open propulsor rotor include a propeller rotor for a turboprop propulsion system, a rotorcraft rotor (e.g., a main helicopter rotor) for a turboshaft propulsion system, a propfan rotor for a propfan propulsion system, and a pusher fan rotor for a pusher fan propulsion system. An example of the ducted propulsor rotor is a fan rotor for a turbofan propulsion system. The present disclosure, however, is not limited to the foregoing exemplary propulsor rotor arrangements. Moreover, the driven rotor 24 may alternatively be a generator rotor of an electric power generator where the aircraft powerplant 10 is (or is part of) the aircraft electric power system. However, for ease of description, the driven rotor 24 may be generally described below as the propulsor rotor 26; e.g., the fan rotor for the turbofan propulsion system.

The engine core 14 of FIG. 1 includes a compressor section 28, a combustor section 29 and a turbine section 30. The compressor section 28 of FIG. 1 includes a low pressure compressor (LPC) section 28A and a high pressure compressor (HPC) section 28B. The turbine section 30 of FIG. 1 includes a high pressure turbine (HPT) section 30A and a low pressure turbine (LPT) section 30B. The engine core 14 also includes a core flowpath 32 and an engine housing 34. The core flowpath 32 extends longitudinally in the engine core 14 and through the engine sections 28A-30B from an airflow inlet 36 into the core flowpath 32 to a combustion products exhaust 38 from the core flowpath 32. The engine housing 34 is configured to house one or more of the engine sections 28A-30B.

Each of the engine sections 28A, 28B, 30A and 30B includes a respective bladed engine rotor 40-43. Each of these engine rotors 40-43 includes a plurality of rotor blades arranged circumferentially around and connected to one or more respective rotor disks and/or hubs. The rotor blades, for example, may be formed integral with or mechanically fastened, welded, brazed and/or otherwise attached to the respective rotor disk(s) and/or hub(s).

The HPT rotor 42 is connected to and configured to drive rotation of the HPC rotor 41 through a high speed shaft 46. At least (or only) the HPC rotor 41, the HPT rotor 42 and the high speed shaft 46 may collectively form a high speed rotating assembly 48 of the engine core 14. The LPT rotor 43 is connected to and configured to drive rotation of the LPC rotor 40 through a low speed shaft 50. At least (or only) the LPC rotor 40, the LPT rotor 43 and the low speed shaft 50 may collectively form a low speed rotating assembly 52 of the engine core 14. The low speed rotating assembly 52 is operatively coupled to and configured to drive rotation of the propulsor rotor 26 (e.g., the driven rotor 24) through a drivetrain 54. This drivetrain 54 may be configured as a geared drivetrain, where a geartrain 56 (e.g., a transmission, a speed change device, an epicyclic geartrain, etc.) is disposed between and operatively couples the propulsor rotor 26 to the low speed rotating assembly 52 and its LPT rotor 43. With this arrangement, the propulsor rotor 26 may rotate at a different (e.g., slower) rotational velocity than the low speed rotating assembly 52 and its LPT rotor 43. However, the drivetrain 54 may alternatively be configured as a direct drive drivetrain, where the geartrain 56 is omitted. With this arrangement, the propulsor rotor 26 rotates at a common (the same) rotational velocity as the low speed rotating assembly 52 and its LPT rotor 43. Referring again to FIG. 1, each of the engine rotating assemblies 48, 52 and its members may be rotatable about a respective rotational axis. In particular, the engine rotating assemblies 48, 52 of FIG. 1 is configured to rotate about a common rotational axis 58, which rotational axis 58 may also be an axial centerline of the engine core 14.

During operation of the turbine engine 16, air enters the engine core 14 and its core flowpath 32 through the core inlet 36. This air entering the core flowpath 32 may be referred to as "core air". The core air is compressed by the LPC rotor 40 and the HPC rotor 41 and directed into a combustion chamber 60 (e.g., an annular combustion chamber) of a combustor 62 (e.g., an annular combustor) in the combustor section 29. Fuel is injected into the combustion chamber 60 by one or more fuel injectors 64 and mixed with the compressed core air to provide a fuel-air mixture. This fuel-air mixture is ignited and combustion products thereof flow through and sequentially cause the HPT rotor 42 and the LPT rotor 43 to rotate. The rotation of the HPT rotor 42 and the LPT rotor 43 respectively drive rotation of the HPC rotor 41 and the LPC rotor 40 and, thus, compression of the air received from the core inlet 36. The rotation of the LPT rotor 43 also drives rotation of the propulsor rotor 26 (the driven rotor 24). The rotation of the propulsor rotor 26 propels air outside of (e.g., radially outboard of and along) the engine core 14 and its engine housing 34; e.g., through a bypass duct or outside of the aircraft propulsion system. The propulsion of this air outside of the engine core 14 may account for a majority of thrust generated by the aircraft propulsion system. Of course, where the mechanical load 12 also or alternatively includes the generator rotor, the rotation of the LPT rotor 43 may drive the electric power generator to generate electricity.

Figure 2:
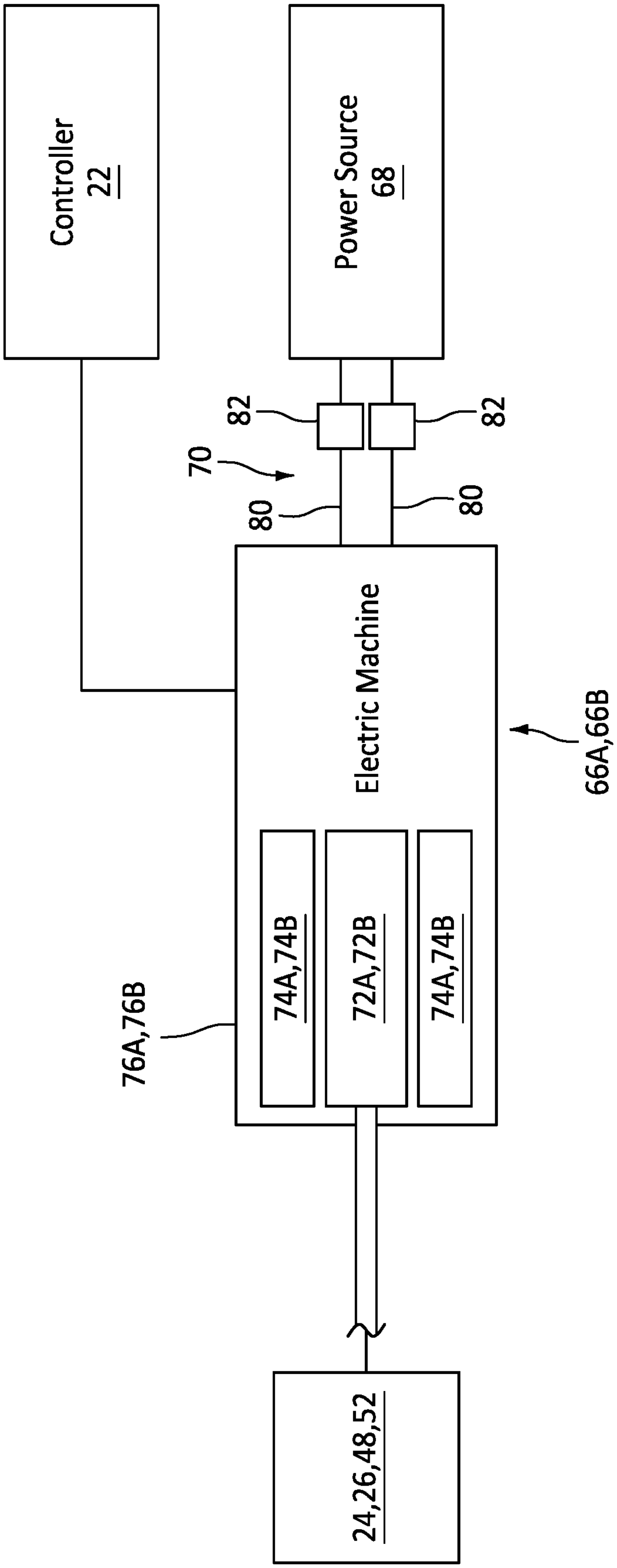
FIG. 2 is a schematic illustration of a portion of the aircraft propulsion system with an electric machine.

The electric machine system 18 of FIG. 1 includes one or more electric machines 66A and 66B (generally referred to as "66"). Referring to FIG. 2, the electric machine system 18 also includes an electric power source 68 and an electrical power bus 70.

Each electric machine 66 may be configurable as an electric motor and/or an electric generator; e.g., a motor-generator. Alternatively, one or more of the electric machines 66 may be configured as a dedicated electric motor.

The electric machine 66 of FIG. 2 includes an electric machine rotor 72A, 72B (generally referred to as "72"), an electric machine stator 74A, 74B (generally referred to as "74") and an electric machine housing 76A, 76B (generally referred to as "76"). The machine rotor 72 is rotatable about a rotational axis of the machine rotor 72, which rotational axis may also be an axial centerline of the electric machine 66. The machine stator 74 of FIG. 2 is radially outboard of and circumscribes the machine rotor 72. With this arrangement, the electric machine 66 is configured as a radial flux electric machine. The electric machine 66 of the present disclosure, however, is not limited to such an exemplary rotor-stator configuration nor to radial flux arrangements. The machine rotor 72, for example, may alternatively be radially outboard of and circumscribe the machine stator 74. In another example, the machine rotor 72 may be axially next to the machine stator 74 configuring the electric machine 66 as an axial flux electric machine. Referring again to FIG. 2, the machine rotor 72 and the machine stator 74 are at least partially or completely housed within the machine housing 76.

Referring to FIG. 1, the high speed machine rotor 72A of the high speed electric machine 66A is operatively coupled to the high speed rotating assembly 48. The high speed machine rotor 72A of FIG. 1, for example, is rotatable with the high speed rotating assembly 48 through a geared drivetrain 78A with a gearbox coupled with and between the high speed machine rotor 72A and the high speed rotating assembly 48. The low speed machine rotor 72B of the low speed electric machine 66B is operatively coupled to the low speed rotating assembly 52. The low speed machine rotor 72B of FIG. 1, for example, is rotatable with the low speed rotating assembly 52 through a geared drivetrain 78B with a gearbox coupled with and between the low speed machine rotor 72B and the low speed rotating assembly 52. With this arrangement, the low speed machine rotor 72B is coupled to the propulsor rotor 26 (the driven rotor 24) through the low speed rotating assembly 52. In other embodiments, however, the low speed machine rotor 72B may be coupled to the propulsor rotor 26 independent of the low speed rotating assembly 52. The low speed machine rotor 72B and the low speed rotating assembly 52, for example, may be coupled in parallel to the propulsor rotor 26 through the geartrain 56.

Referring to FIG. 2, during a motor mode of operation, the respective electric machine 66 operates as the electric motor to convert electricity received from the power source 68 into mechanical power. The machine stator 74, for example, may generate an electromagnetic field with the machine rotor 72 using the electricity. The electromagnetic field may drive rotation of the machine rotor 72, and the machine rotor 72 may drive rotation of the respective powerplant member(s) (e.g., 26, 48, 52) coupled thereto and rotatable therewith (see also FIG. 1). During this motor mode of operation, mechanical power output by the respective electric machine 66 may be utilized for various purposes. For example, referring to FIG. 1, the electric machine mechanical power may boost mechanical power output by the engine core 14 and its low speed rotating assembly 52 for driving rotation of the propulsor rotor 26 (the driven rotor 24). In another example, the electric machine mechanical power may completely power rotation of the propulsor rotor 26 (the driven rotor 24) and/or rotation of the low speed rotating assembly 52; e.g., during startup of the turbine engine 16.

Referring to FIG. 2, during a generator mode of operation, the respective electric machine 66 operates as the electric generator to convert mechanical power into electricity. For example, the respective powerplant member(s) (e.g., 48, 52) coupled to the machine rotor 72 may drive rotation of the machine rotor 72; see also FIG. 1. The rotation of the machine rotor 72 may generate an electromagnetic field with the machine stator 74. The machine stator 74 may convert energy from the electromagnetic field into the electricity. The respective electric machine 66 may output this generated electricity to the power bus 70 for further use; e.g., storage, provision to other aircraft components and/or systems, etc.

The power source 68 is configured to store electricity. The power source 68 is also configured to provide the stored electricity to each electric machine 66 and/or receive electricity from each electric machine 66. The power source 68, for example, may be configured as or otherwise include one or more electricity storage devices; e.g., batteries, supercapacitors, etc.

The power bus 70 electrically couples the power source 68 to each electric machine 66. The power bus 70, for example, may include one or more electrical lines 80; e.g., high voltage lines. Each electrical line 80 of FIG. 2 is electrically coupled to and extends between the power source 68 and a respective one of the electric machines 66. Of course, the electric machine system 18 may also include one or more additional electric devices 82 electrically coupled between the power source 68 and each electric machine 66 along one or more of the electrical lines 80. Examples of these electric devices 82 include, but are not limited to, switches, current regulators, converters, amplifiers, buffers and the like.

Figure 3:
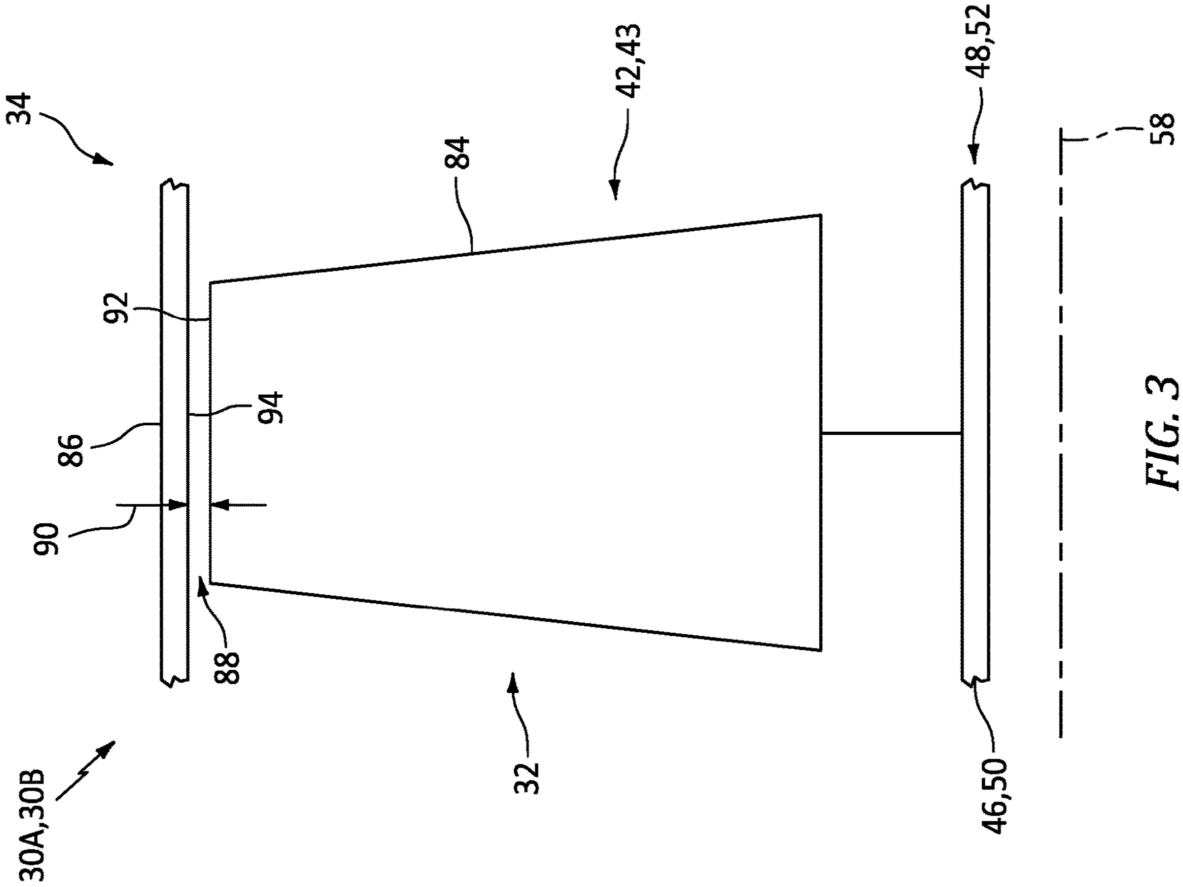
FIG. 3 is a partial schematic illustration of a turbine rotor within an outer shroud.

FIG. 3 illustrates a turbine rotor (e.g., 42, 43) with an array of turbine blades 84 (one visible in FIG. 3) which are surrounded by an outer shroud 86; e.g., a turbine shroud such as a blade outer air seal (BOAS). The outer shroud 86 of FIG. 3 is configured to house the turbine blades 84 and form an outer peripheral boundary of the core flowpath 32 across the turbine rotor 42, 43 and its turbine blades 84. The outer shroud 86 of FIG. 3, for example, is disposed radially outboard of and circumscribes the turbine rotor 42, 43 and its turbine blades 84.

Efficiency of a turbine section (e.g., 30A, 30B) and a turbine engine in general may be affected by clearance between its turbine rotor (e.g., 42, 43) and the outer shroud 86. A clearance gap 88, for example, is provided between the turbine rotor 42, 43 and the outer shroud 86. This clearance gap 88 has a height 90 which extends radially (and/or axially) from tips 92 of the turbine blades 84 to an outer flowpath surface 94 formed by the outer shroud 86. The clearance gap 88 and its height 90 may be sized large enough to prevent (or significantly reduce likelihood of) rubbing between each blade tip 92 and the outer shroud 86 and its outer flowpath surface 94. However, as the clearance gap 88 and its height 90 increase, combustion products leakage across the blade tip 92 also increases. Increasing combustion products leakage across the blade tips 92 reduces a volume of the combustion products expanded across by the turbine rotor 42, 43. Increasing combustion products leakage across the blade tips 92 may also increase boundary layer turbulence along the outer flowpath surface 94. Thus, as combustion products leakage across the blade tips 92 increases, turbine section efficiency decreases. Therefore, the clearance gap 88 and its height 90 are typically sized large enough to prevent (or significantly reduce likelihood of) rubbing between the blade tips 92 and the outer shroud 86 and its outer flowpath surface 94, while small enough to minimize combustion products leakage across the blade tips 92.

The turbine rotor 42, 43 and the outer shroud 86 may be subject to different environmental conditions during engine core operation. For example, while the turbine blades 84 and the outer flowpath surface 94 are exposed to the relatively hot combustion products flowing through the core flowpath 32, a backside (e.g., an outer side) of the outer shroud 86 may be subject to relatively cool air; e.g., cooling air. Rapid changes in temperature of the combustion products, inter alia, may thereby subject the turbine rotor 42, 43 and the outer shroud 86 to differential thermal expansion or contraction therebetween. This differential thermal expansion or contraction between the turbine rotor 42, 43 and the outer shroud 86 may cause the blade tips 92 to move radially outward or inward relative to the outer shroud 86 and its outer flowpath surface 94. If left unmitigated, such radial movement of the blade tips 92 may lead to a size change in the clearance gap 88 and its height 90. Where the size change is an increase in the clearance gap 88 and its height 90, additional combustion products may leak across the blade tips 92. Where the size change is a decrease in the clearance gap 88 and its height 90, there may be a risk of blade tip rub against the outer shroud 86; e.g., pinch.

Figure 4:
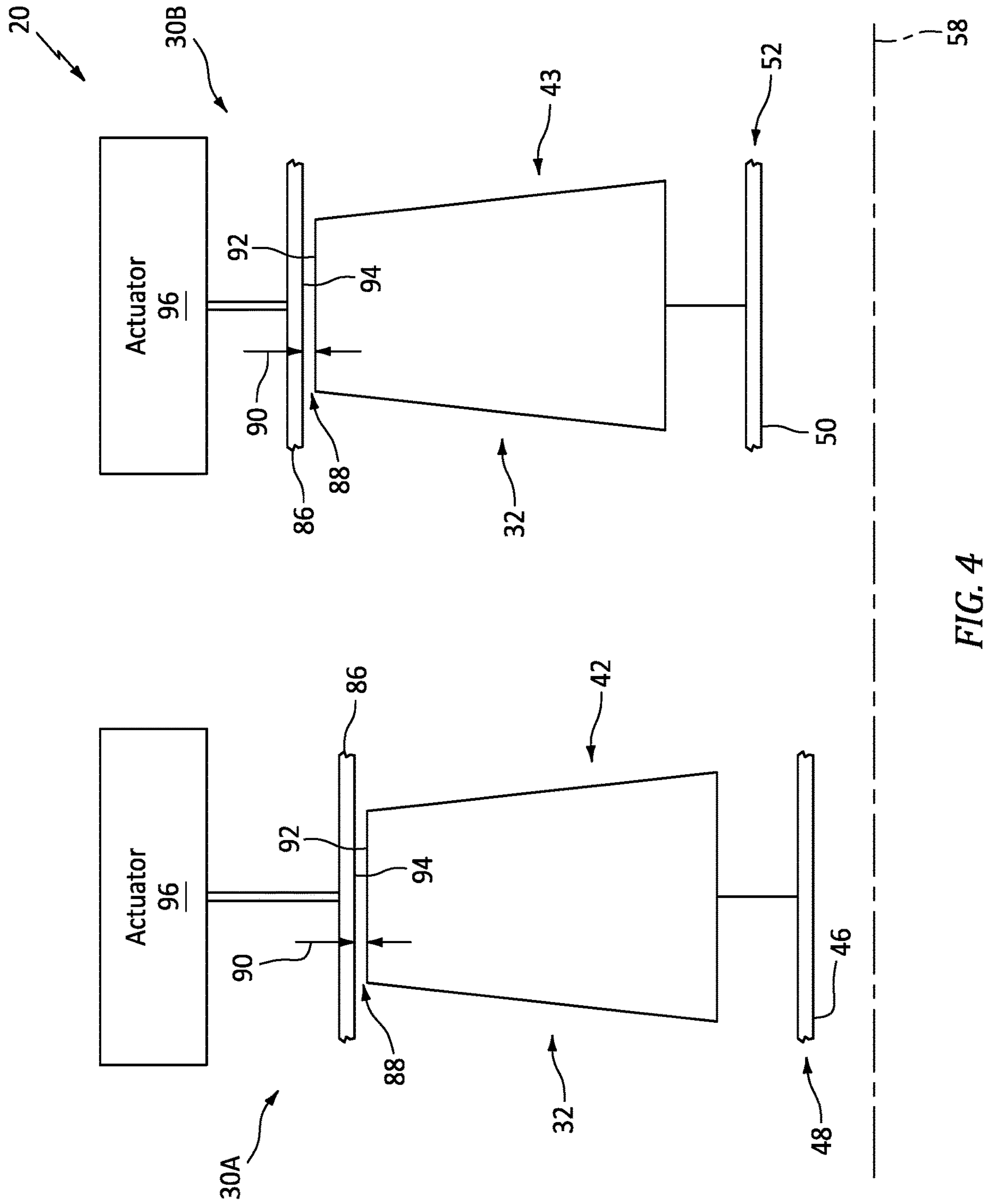
FIG. 4 is a partial schematic illustration of a tip clearance control system arranged with a turbine section of the aircraft propulsion system.

Referring to FIG. 4, the clearance control system 20 is provided to account for, inter alia, radial movement of the blade tips 92 resulting from thermal expansion and/or contraction of each turbine rotor 42, 43 and its blade tips 92 and/or thermal expansion and/or contraction of the outer shroud 86. More particularly, the clearance control system 20 is configured to control (e.g., vary and/or maintain) the clearance between each turbine rotor 42, 43 and the associated outer shroud 86. The clearance control system 20 of FIG. 4, for example, includes one or more actuators 96 operatively coupled to the respective outer shrouds 86. Each actuator 96 is configured to adjust the clearance gap 88 and its height 90 between the respective turbine rotor 42, 43 and the respective outer shroud 86. For example, each actuator 96 may be configured to move its respective outer shroud 86 towards the respective turbine rotor 42, 43 and its blade tips 92 to reduce the clearance gap height 90. The clearance control system 20 may thereby close the respective clearance gap 88 to promote turbine section efficiency. In another example, each actuator 96 may be configured to move its respective outer shroud 86 away from the respective turbine rotor 42, 43 and its blade tips 92 to increase the clearance gap height 90. The clearance control system 20 may thereby open the respective clearance gap 88 to reduce risk of contact (e.g., rub) between the respective turbine rotor 42, 43 and the adjacent outer shroud 86. Each actuator 96 may be configured as or otherwise include one or more cooling conduits (e.g., impingement manifold(s)), a pneumatic actuator, a hydraulic actuator, an electric motor, or the like. The present disclosure, however, is not limited to such an exemplary arrangement. Moreover, various types and configurations of clearance control systems are known in the art, and the present disclosure is not limited to any particular ones thereof.

Referring to FIG. 1, the controller 22 is in signal communication with (e.g., hardwired and/or wirelessly coupled to) a fuel system 98 for the turbine engine 16, the electric machine system 18 and the clearance control system 20, where the fuel system 98 includes the fuel injectors 64, a fuel source and a flow regulator (e.g., a pump and/or valve(s)) between and fluidly coupled with the fuel injectors 64 and the fuel source. The controller 22 may be configured as an onboard engine controller; e.g., an electronic engine controller (EEC), an electronic control unit (ECU), a full-authority digital engine controller (FADEC), etc. The controller 22 may be implemented with a combination of hardware and software. The hardware may include a memory and at least one processing device, which processing device may include one or more single-core and/or multi-core processors. The hardware may also or alternatively include analog and/or digital circuitry other than that described above.

The memory is configured to store software (e.g., program instructions) for execution by the processing device, which software execution may control and/or facilitate performance of one or more operations such as those described in the methods below. The memory may be a non-transitory computer readable medium. For example, the memory may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 5:
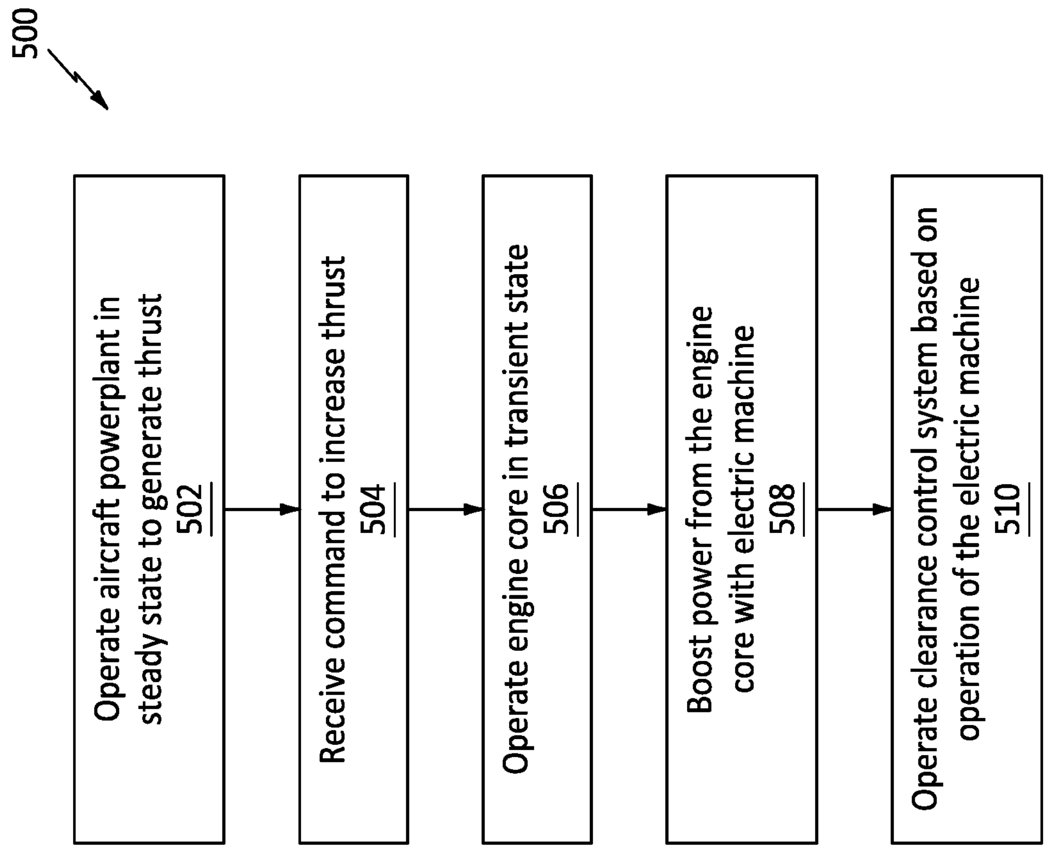
FIG. 5 is a flow diagram of a method for operating an aircraft propulsion system.

FIG. 5 is a flow diagram of a method 500 for operating an aircraft powerplant. For ease of description, the operating method 500 is described below with reference to the aircraft powerplant 10 of FIG. 1 and its systems of FIGS. 2 and 4. The present disclosure, however, is not limited to such an exemplary powerplant arrangement. Moreover, it is contemplated the operating method 500 may also be performed with a powerplant for a non-aircraft application.

In step 502, the aircraft powerplant 10 is operated to drive rotation of the propulsor rotor 26 (the driven rotor 24). Here, the rotation of the propulsor rotor 26 may provide substantially steady-state propulsion system thrust. The controller 22, for example, may signal the fuel system 98 of the turbine engine 16 to deliver the fuel to the combustor section 29 and its combustor 62 for mixing with the compressed core air and subsequent combustion as described above. The fuel system 98 may deliver the fuel at a substantially steady-state rate such that the turbine engine 16 and its engine core 14 may output substantially steady-state mechanical power for driving the rotation of the propulsor rotor 26. During some operating conditions, each electric machine 66 may be dormant as the electric motor. Each electric machine 66, for example, may be completely non-operational (or non-operational at least as the electric motor) and thereby provide a zero power output during the step 502. Thus, neither electric machine 66 may generate mechanical power to boost the mechanical power output by the engine core 14 for driving the rotation of the propulsor rotor 26. During other operating conditions, one or more of the electric machines 66 may alternatively operate as the electric motor. However, even when operating as the electric motor, each electric machine 66 may generate mechanical power in such a fashion so as to maintain the steady-state propulsion system thrust generation by the propulsor rotor 26. For example, the low speed electric machine 66B may generate a substantially uniform rate of mechanical power for boosting mechanical power to a respective powerplant member.

During the steady-state operation of the turbine engine 16 and its engine core 14, a temperature of the combustion products flowing through each turbine section 30A, 30B may be substantially constant. Thus, the HPT rotor 42 and the LPT rotor 43 may each be subject to relatively small (if any) differential thermally induced movement relative to their associated outer shrouds 86. The controller 22 may thereby signal the clearance control system 20 to maintain relatively small clearance gaps 88 between the turbine rotors 42 and 43 and their associated outer shrouds 86.

In step 504, the controller 22 may receive a command to increase the propulsion system thrust from a first thrust level to a second thrust level. An aircraft pilot or automated throttle, for example, may change a powerplant throttle position to a higher level.

Figure 6:
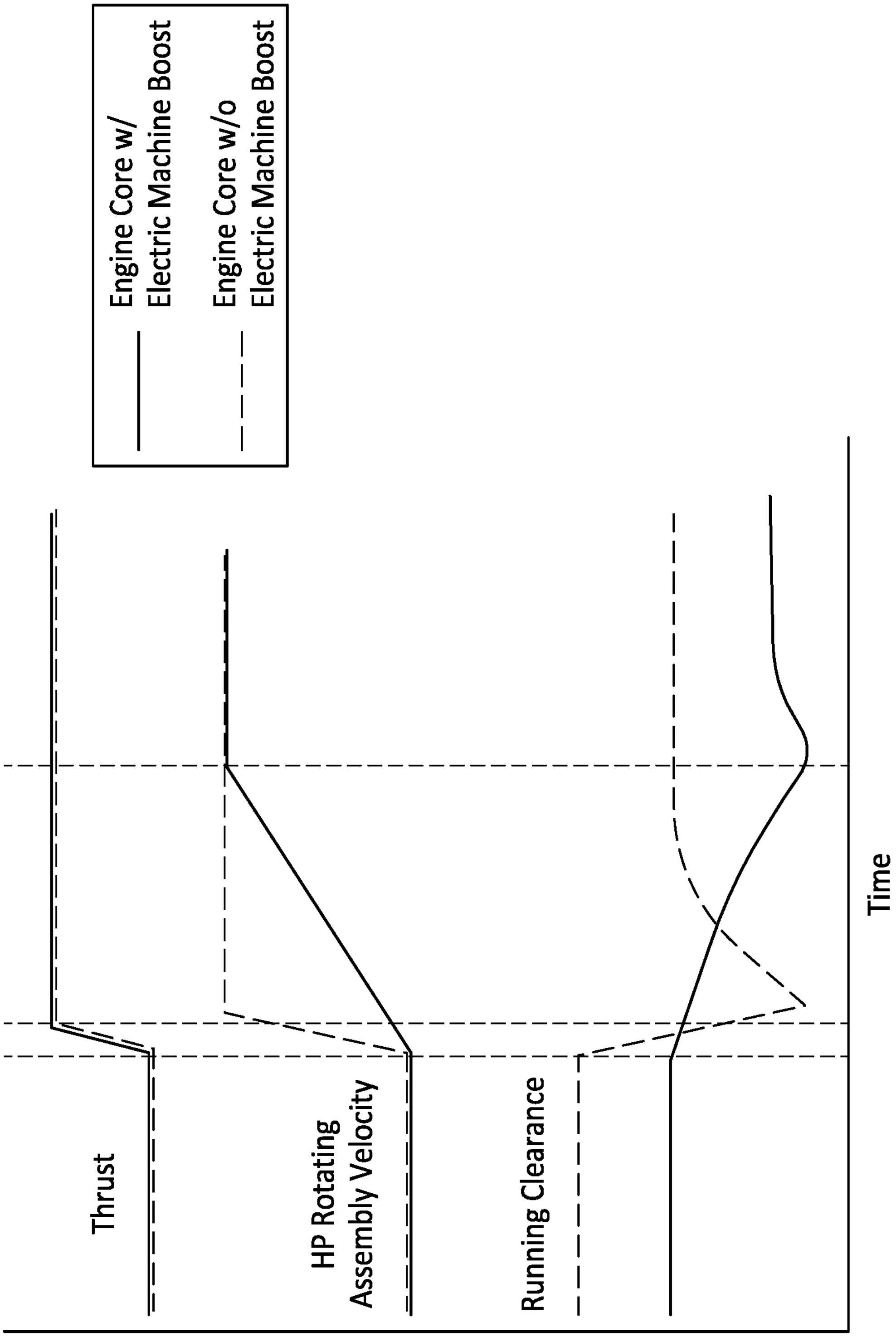
FIG. 6 is a graphical depiction of various operational parameters plotted versus time during increased thrust generation with and without electric machine power boost.

In step 506, in response to the command to increase the propulsion system thrust, the turbine engine 16 and its engine core 14 may be operated in a transient state to increase its mechanical power output for driving the rotation of the propulsor rotor 26 from a first power level to a second power level. For example, the controller 22 may signal the fuel system 98 to progressively deliver additional fuel to the combustor section 29 and its combustor 62 for mixing with the compressed core air and subsequent combustion. The delivery and subsequent combustion of the additional fuel increases the temperature of the combustion products flowing through each turbine section 30A, 30B. While the additional fuel may be delivered quickly to meet the increased thrust demand using (e.g., only) the turbine engine 16 and its engine core 14, the temperature of the combustion products may also quickly rise increasing the differential thermally induced movement between the turbine rotors 42 and 43 and the outer shrouds 86. Referring to FIG. 6, an increase in the differential thermally induced movement between the turbine rotors 42 and 43 and the outer shrouds 86 may be tied to a quick acceleration in a rotational velocity of the high speed rotating assembly 48. To substantially reduce the differential thermally induced movement between the turbine rotors 42 and 43 and the outer shrouds 86 during the transient operation of the engine core 14, the controller 22 may signal the fuel system 98 to slowly increase the fuel delivered to the combustor 62 over a relatively long period of time. For example, the fuel may be delivered to maintain a rate of change in the temperature of the combustion products within the core flowpath 32 at or below a threshold level during the transient state operation of the engine core 14. This threshold level may be a constant level, or a variable level depending upon the specific operation conditions, a magnitude of the increased thrust demand, etc. The slow increase in fuel delivered to the combustor 62 reduces the rate of acceleration of the high speed rotating assembly 48. The slow increase in fuel delivered to the combustor 62 also reduces a rate of temperature increase of the combustion products as well as a degree of the associated differential thermally induced movement between the turbine rotors 42 and 43 and the outer shrouds 86.

In step 508, the electric machine system 18 is operated to boost the mechanical power to the propulsor rotor 26. In particular, while the engine core 14 is operating in the transient state of the step 506, the controller 22 may signal the low speed electric machine 66B to boost the mechanical power to the propulsor rotor 26. This power boost may be performed such that the increased thrust demand is quickly fulfilled; e.g., without any delay or significant delay. For example, a period of time for the thrust generated by the propulsor rotor 26 to increase from the first thrust level to the second thrust level may be significantly (e.g., at least two, three or five times) less than the period of time for the power output from the engine core 14 to increase from the first power level to the second power level. Here, the low speed electric machine 66B may be used to temporarily backup the engine core 14 while powering up of the engine core 14 is delayed to reduce the differential thermally induced movement between the turbine rotors 42 and 43 and the outer shrouds 86. Therefore, as the power output by the engine core 14 increases, the power output by the low speed electric machine 66B decreases until the engine core 14 can fully meet the new power demand to fulfill the increased thrust demand. Thus, the low speed electric machine 66B may be operated to output a common (the same) power output at (a) a point in time just before or when the engine core 14 enters the transient state (e.g., when the command is received) and (b) a point in time just after or when the engine core 14 exits the transient state. Note, while the low speed electric machine 66B is operated to boost the power to make up for the delayed (e.g., slowed) increase in fuel delivery to the combustor 62, the high speed electric machine 66A may be dormant as the electric motor; e.g., non-operational.

In step 510, the clearance control system 20 is operated based on the operation of the electric machine system 18. For example, where the low speed electric machine 66B is boosting the power to the propulsor rotor 26 while the engine core 14 is in the transient state, the controller 22 may signal the clearance control system 20 to maintain relatively small clearance gaps 88 between the turbine rotors 42 and 43 and their associated outer shrouds 86 since the engine core 14 is operated to reduce differential thermally induced movement between the turbine rotors 42 and 43 and the outer shrouds 86. In particular, by reducing the differential thermally induced movement between the turbine rotors 42 and 43 and the outer shrouds 86, a pinch point margin may be reduced while the engine core 14 is operating in the transient state as shown in FIG. 6. This in turn may facilitate operating the engine core 14 with tighter clearance gaps 88 and, thus, operating the engine core 14 at a higher efficiency. By contrast, when the engine core 14 is operated in the transient state without a power boost from the low speed electric machine 66B, the pinch point margin may be relatively large. Thus, the clearance control system 20 may be operated with relatively large clearance gaps 88 for a longer period of time. In other words, the controller 22 may modify a target for the clearance gaps 88 based on, inter alia, whether or not the low speed electric machine 66B is being operated to facilitate slower spooling up of the engine core 14.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An operating method, comprising:

receiving a command to increase thrust generated by a propulsor rotor from a first thrust level to a second thrust level, the propulsor rotor operatively coupled to an engine core and an electric machine, the engine core including a flowpath, a compressor section, a combustor section and a turbine section, and the flowpath extending through the compressor section, the combustor section and the turbine section from an inlet into the flowpath to an exhaust from the flowpath;

operating the engine core in a transient state to increase power output from the engine core to the propulsor rotor from a first power level to a second power level in response to the command;

operating the electric machine to boost the power output from the engine core to the propulsor rotor while the engine core is operating in the transient state; and operating a clearance control system for the engine core based on the operation of the electric machine;

wherein the clearance control system is configured to adjust clearance between a first turbine rotor in the turbine section and a first shroud circumscribing the first turbine rotor, based on the operation of the electric machine;

wherein the engine core is operated in the transient state to maintain a rate of change in temperature of combustion products within the flowpath below a threshold level and reduce differential thermally induced movement between the first turbine rotor and the first shroud during transient operation of the engine core;

wherein during the operation of the engine core in the transient state and prior to the operation of the electric machine, the clearance control system maintains a first pinch point margin between the first turbine rotor and the first shroud; and wherein during the operation of the electric machine, the clearance control system changes the first pinch point margin to a second pinch point margin, and the second pinch point margin is less than the first pinch point margin.

2. The operating method of claim 1, wherein power output from the electric machine to the propulsor rotor, which boosts the power output from the engine core to the propulsor rotor while the engine core is operating in the transient state, decreases as the power output from the engine core to the propulsor rotor increases from the first power level to the second power level.

3. The operating method of claim 1, wherein power output from the electric machine to the propulsor rotor when the engine core enters the transient state is equal to the power output from the electric machine to the propulsor rotor when the engine core exits the transient state.

4. The operating method of claim 3, wherein the power output from the electric machine to the propulsor rotor when the engine core enters the transient state is a zero power output.

5. The operating method of claim 3, wherein the power output from the electric machine to the propulsor rotor when the engine core enters the transient state is a non-zero power output.

6. The operating method of claim 1, wherein a first period of time for the thrust generated by the propulsor rotor to increase from the first thrust level to the second thrust level is less than a second period of time for the power output from the engine core to the propulsor rotor to increase from the first power level to the second power level.

7. The operating method of claim 6, wherein the first period of time is at least two times greater than the second period of time.

8. The operating method of claim 1, wherein the engine core further includes a first rotating assembly and a second rotating assembly;

the first rotating assembly includes a first compressor rotor in the compressor section and the first turbine rotor in the turbine section; and the second rotating assembly comprises a second turbine rotor in the turbine section, and the second rotating assembly is operatively coupled to the propulsor rotor.

9. The operating method of claim 8, wherein the clearance control system is further configured to adjust clearance between the second turbine rotor and a second shroud circumscribing the second turbine rotor.

10. The operating method of claim 8, wherein the electric machine is operatively coupled to the propulsor rotor through the second rotating assembly.

11. The operating method of claim 8, wherein the electric machine is operatively coupled to the propulsor rotor independent of the second rotating assembly.

12. The operating method of claim 8, wherein another electric machine is operatively coupled to the first rotating assembly and provides a zero power output to the first rotating assembly during the operation of the engine core in the transient state.

13. The operating method of claim 1, wherein the propulsor rotor comprises a ducted propulsor rotor.

14. The operating method of claim 1, wherein the propulsor rotor comprises an open propulsor rotor.

15. The operating method of claim 1, wherein the clearance control system includes at least one actuator operatively coupled to the first shroud; and the operation of the clearance control system includes using the at least one actuator to adjust a clearance gap between the first turbine rotor and the first shroud.

* * * * *